(12) United States Patent
Kobayashi et al.

(10) Patent No.: US 10,564,473 B2
(45) Date of Patent: Feb. 18, 2020

(54) DISPLAY APPARATUS AND MANUFACTURING METHOD OF DISPLAY APPARATUS

(71) Applicant: AGC Inc., Chiyoda-ku (JP)

(72) Inventors: Katsuhiro Kobayashi, Chiyoda-ku (JP); Yuki Hori, Chiyoda-ku (JP); Kazushige Ota, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/033,686

(22) Filed: Jul. 12, 2018

(65) Prior Publication Data

US 2019/0018285 A1   Jan. 17, 2019

(30) Foreign Application Priority Data

Jul. 13, 2017  (JP) .................................. 2017-137118
May 23, 2018  (JP) ................................. 2018-098512

(51) Int. Cl.
*G02F 1/1333* (2006.01)
*G02F 1/1335* (2006.01)
*G06F 3/041* (2006.01)

(52) U.S. Cl.
CPC .. *G02F 1/133608* (2013.01); *G02F 1/133308* (2013.01); *G02F 1/133512* (2013.01); *G02F 1/133514* (2013.01); *G06F 3/0412* (2013.01); *G02F 2001/133322* (2013.01)

(58) Field of Classification Search
CPC .... G02F 1/13; G02F 1/1333; G02F 1/133308; G02F 1/133608; G02F 1/133615; G02F 1/1335; G02F 1/133512; G02F 1/1336; G02F 1/133602; G02F 2001/133314; G02F 2001/133317; G02F 2001/133332; G02F 2001/133331; G02F 2001/133322; G02F 2001/133311; G02F 2001/133325; G02F 2202/28; G02F 2201/46; G02F 2201/50; G06F 1/1601; G06F 3/0412; G09F 2013/222; G09F 13/04
See application file for complete search history.

(56) References Cited

U.S. PATENT DOCUMENTS 9,208,659 B2 * 12/2015 Oosawa ............... G07F 19/205
2016/0252769 A1   9/2016 Niiyama et al.
2018/0067386 A1 *  3/2018 Dong .................. G03B 21/208

FOREIGN PATENT DOCUMENTS

WO   WO 2015/072380 A1   5/2015

* cited by examiner

*Primary Examiner* — Thoi V Duong
(74) *Attorney, Agent, or Firm* — Oblon, McClelland, Maier & Neustadt, L.L.P.

(57) ABSTRACT

A display apparatus includes a transparent plate; a liquid crystal panel affixed to a main surface of the transparent plate; a backlight configured to illuminate the liquid crystal panel from a side opposite to the transparent plate; and a fixing support configured to fix the backlight to the transparent plate. The fixing support includes a first opposing part that opposes the main surface of the transparent plate, and a second opposing part that opposes an end surface of the backlight. The first opposing part is affixed to the main surface of the transparent plate, and the second opposing part is fastened with the end surface of the backlight by a male screw that penetrates through an elongated hole of the second opposing part, and a female screw that is mated with the male screw.

16 Claims, 13 Drawing Sheets

DISPLAY APPARATUS AND MANUFACTURING METHOD OF DISPLAY APPARATUS

CROSS-REFERENCE TO RELATED APPLICATION

The present application is based on and claims benefit of priority under 35 U.S.C. § 119 of Japanese Patent Applications No. 2017-137118, filed Jul. 13, 2017, and No. 2018-098512, filed May 23, 2018. The contents of the applications are incorporated herein by reference in their entirety.

BACKGROUND OF THE INVENTION

1. Field of the Invention

The disclosure herein generally relates to a display apparatus and a manufacturing method of the display apparatus.

2. Description of the Related Art

Recently, display apparatuses each configured of a transparent plate such as a window glass; a liquid crystal panel affixed to a main surface of the transparent plate; and a backlight for illuminating the liquid crystal panel from a side opposite to the transparent plate have been proposed (For example, see PCT international application publication No. WO 2015/072380). The display apparatuses are used as, for example, digital signage for displaying advertisements.

SUMMARY OF THE INVENTION

Technical Problem

FIG. 15 is a cross-sectional diagram depicting a display apparatus of a related art. In FIG. 15, a dashed-two dotted line indicates a position of a backlight 140 when a position alignment is performed for a liquid crystal panel 130 affixed to a main surface 121 of a transparent plate 120 with the backlight 140.

As illustrated by a dashed line in FIG. 15, first, the liquid crystal panel 130 is affixed to the main surface 121 of the transparent plate 120 via an adhesive layer for liquid crystal panel 139. Then, a position alignment is performed for the liquid crystal panel 130 in an in-plane direction of the main surface 121 of the transparent plate 120 with the backlight 140. The position alignment is necessary in order to uniformly illuminate the liquid crystal panel 130 with the backlight 140.

Then, as illustrated by an arrow in FIG. 15, the backlight 140 is made closer to the main surface 121 of the transparent plate 120, and a fixing support 150 screwed to the backlight 140 is affixed to the main surface 121 of the transparent plate 120 via an adhesive layer for fixing support 159. Thus, the backlight 140 is fixed on the main surface 121 of the transparent plate 120 via the fixing support 150.

However, when the backlight 140 is brought closer to the transparent plate 120, the liquid crystal panel 130 in the in-plane direction of the main surface 121 of the transparent plate 120 may be misaligned with the backlight 140, and the backlight 140 may be fixed at a wrong position.

The present invention is made in consideration of the above-described problem, and mainly aims at providing a display apparatus in which a backlight can be fixed precisely at a predetermined position with respect to a liquid crystal panel affixed to a transparent plate.

Solution to Problem

In order to solve the above-described problem, according to an aspect of the present invention, a display apparatus including a transparent plate;
a liquid crystal panel affixed to a main surface of the transparent plate;
a backlight configured to illuminate the liquid crystal panel from a side opposite to the transparent plate; and
a fixing support configured to fix the backlight to the transparent plate,
the fixing support including a first opposing part that opposes the main surface of the transparent plate, and a second opposing part that opposes an end surface of the backlight, and
the first opposing part being affixed to the main surface of the transparent plate, and the second opposing part being fastened with the end surface of the backlight by a male screw that penetrates through an elongated hole of the second opposing part, and a female screw that is mated with the male screw, is provided.

Effect of Invention

According to an aspect of the present invention, a display apparatus, in which a backlight can be fixed precisely at a predetermined position with respect to a liquid crystal panel affixed to a transparent plate, can be provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

Figure 1:
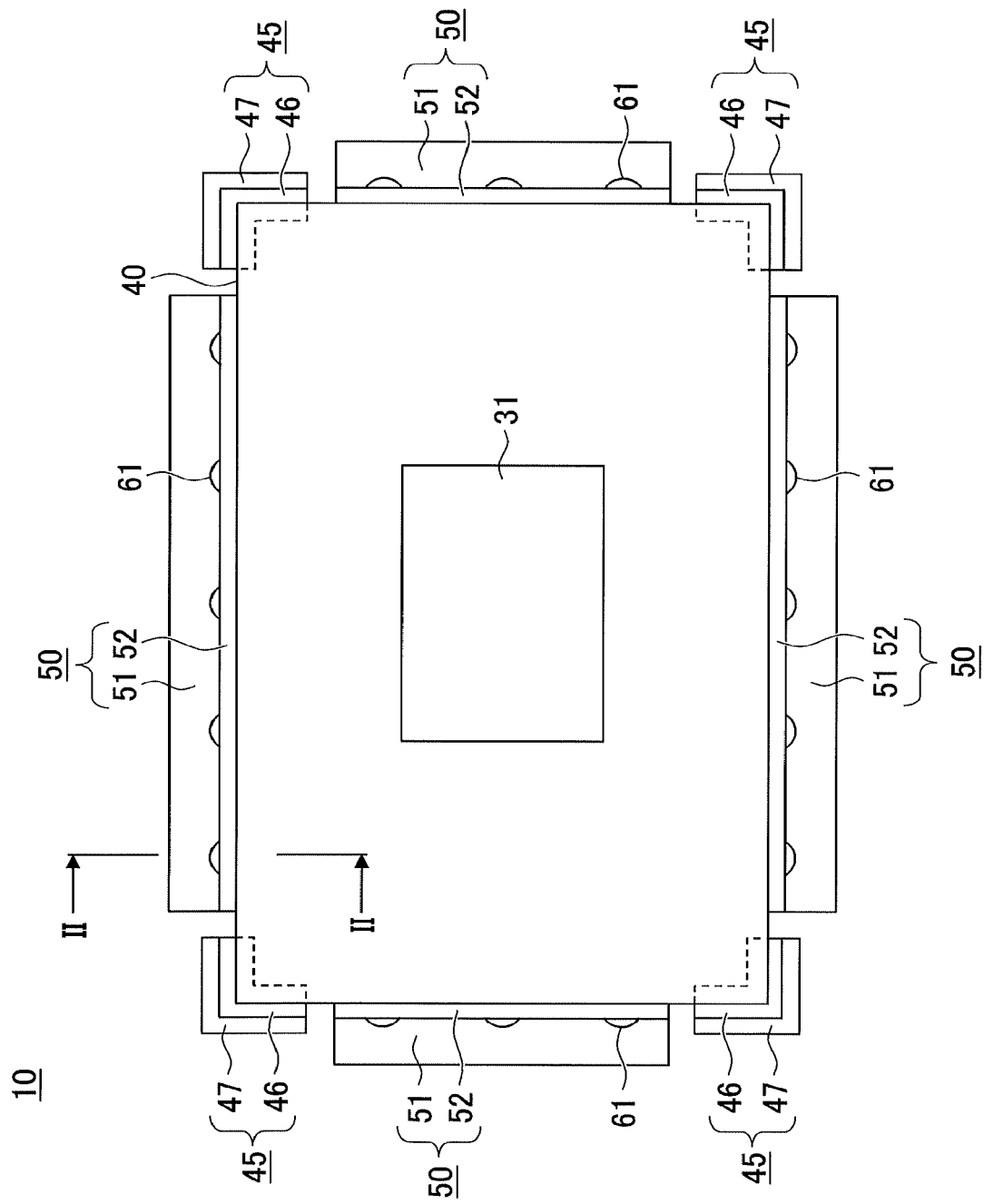
FIG. 1 is a rear view depicting an example of a display apparatus according to an embodiment.

In the following, embodiments of the present invention will be described with reference to the accompanying drawings. In each drawing, to the same or corresponding component, the same or corresponding numeral is assigned, and redundant explanation will be omitted. In the following explanation, an X-direction, a Y-direction and a Z-direction are assumed to be orthogonal to each other. The X-direction is a normal direction to a main surface 21 of a glass plate 20, the Y-direction is parallel to an end surface 41 of a backlight 40 viewed in the X-direction, and the Z-direction is a normal direction to the end surface 41 of the backlight 40 and is an axial direction of a male screw 61. The X-direction corresponds to a first direction recited in claims, and the Y-direction corresponds to a second direction recited in claims.

<Display Apparatus>

Figure 2:
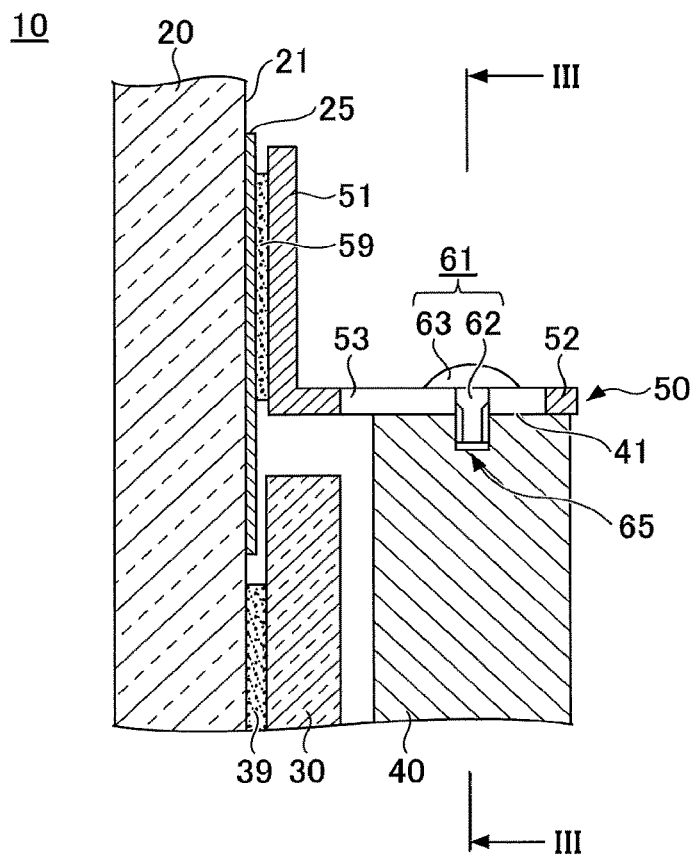
FIG. 2 is a cross-sectional view depicting the display apparatus according to the embodiment, cut along a line II-II in FIG. 1.
Figure 3:
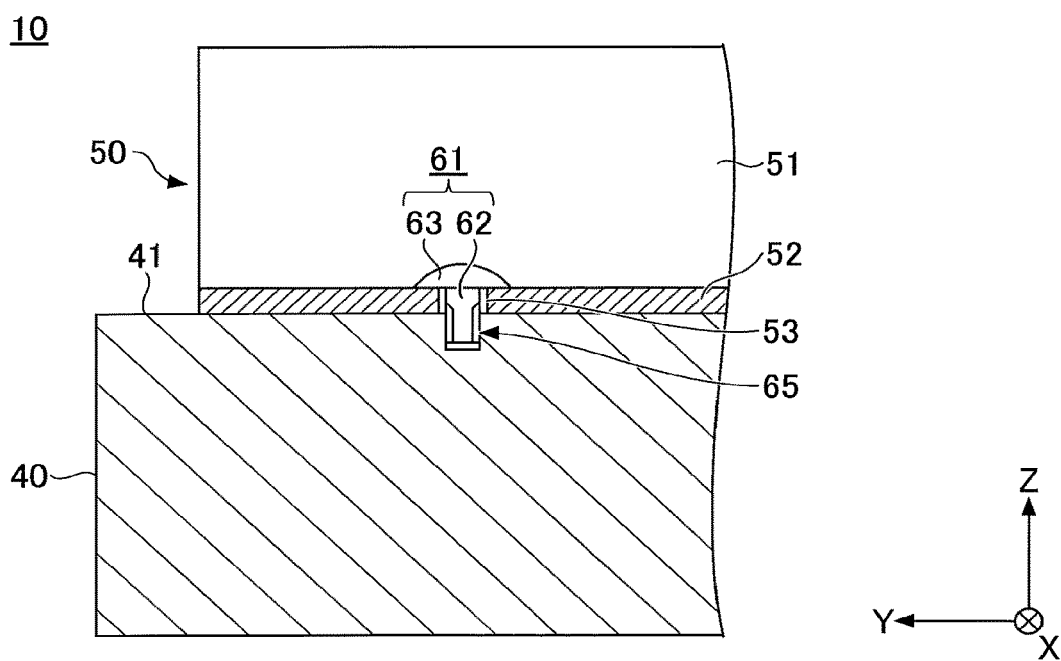
FIG. 3 is a cross sectional view depicting the display apparatus according to the embodiment, cut along a line in FIG. 2.
Figure 4:
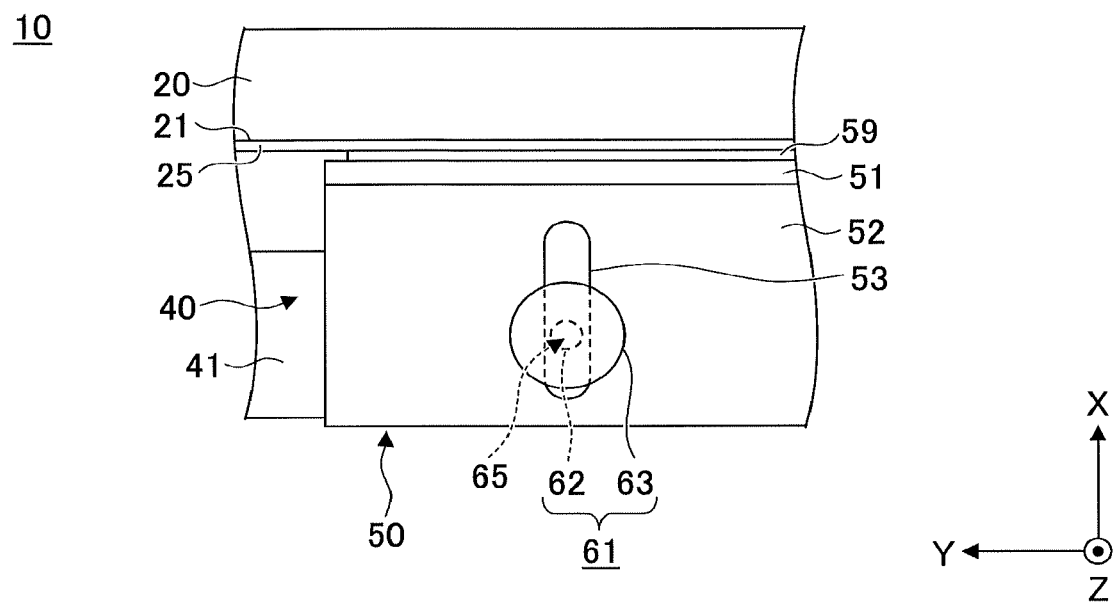
FIG. 4 is a diagram depicting the display apparatus, illustrated in FIG. 2, viewed in a Z-direction.

FIG. 1 is a rear view depicting an example of the display apparatus according to the embodiment. FIG. 2 is a cross-sectional view depicting the display apparatus illustrated in FIG. 1 cut along a line II-II. FIG. 3 is a cross-sectional view depicting the display apparatus illustrated in FIG. 2 cut along a line FIG. 4 is a diagram depicting the display apparatus illustrated in FIG. 2, viewed in the Z-direction.

As illustrated in FIGS. 1 to 4, a display apparatus 10 includes a transparent plate 20, a liquid crystal panel 30 affixed to a main surface 21 of the transparent plate 20, the backlight 40 for illuminating the liquid crystal panel 30 from a side opposite to the transparent plate 20, and a fixing support 50 for fixing the backlight 40 to the transparent plate 20. In the following, each member of the display apparatus 10 will be described.

<Transparent Plate>

The transparent plate 20 is, for example, a window glass. The main surface 21 of the transparent plate 20, to which the liquid crystal panel 30 is affixed, may be an interior surface or may be an exterior surface. Note that the transparent plate 20 may be a plate that compartmentalizes the interior.

A glass plate as the transparent plate 20 is configured of a commonly used glass, such as a soda lime glass. In order to enhance a visibility of an image displayed on the liquid crystal panel 30, a high transmittance glass having little iron and being less bluish may be used. Moreover, in order to enhance safety, a strengthened glass or a laminated glass may be used.

For the transparent plate 20, other than the glass plate, a resin plate may be used. The resin plate is formed of, for example, polycarbonate or polymethylmethacrylate. As the transparent plate 20, any transparent plate may be used if an image displayed on the liquid crystal panel 30 can be viewed through the transparent plate 20.

The main surface 21 of the transparent plate 20, to which the liquid crystal panel 30 is affixed, has a greater area than that of the liquid crystal panel 30. This is because a fixing support 50 is arranged around the liquid crystal panel 30, which is affixed to the transparent plate 20.

On the main surface 21 of the transparent plate 20, to which the liquid crystal panel 30 is affixed, a light shielding layer 25 may be formed preliminarily along an outer periphery of the liquid crystal panel 30. The light shielding layer 25 is formed, for example, by applying a ceramic paint containing a black pigment. In addition, the light shielding layer 25 may be formed by printing an organic material or the like.

The light shielding layer 25 is formed so as to hide the outer periphery of the liquid crystal panel 30 affixed to the transparent plate 20 viewed in the X-direction. According to the above-described arrangement, the fixing support 50 can be hidden. A wiring for providing electric signals to the liquid crystal panel 30 can be also hidden from a user viewing the liquid crystal panel 30 through the transparent plate 20.

The light shielding layer 25 may be formed in a frame shape so as to overlap with a region outside an image display region of the liquid crystal panel 30 affixed to the transparent plate 20, viewed in the X-direction. An open region of the light shielding layer 25 may coincide with the image display region of the liquid crystal panel 30 affixed to the transparent plate 20, viewed in the X-direction.

<Liquid Crystal Panel>

The liquid crystal panel 30 includes, for example, an array substrate, a liquid crystal layer, and a color filter substrate, in this order. The array substrate includes active elements, such as TFT, and transparent pixel electrodes on a liquid crystal layer side. The color filter substrate includes a color filter and transparent counter electrodes on the liquid crystal layer side.

The liquid crystal panel 30 includes a first polarizer arranged on a side opposite to the liquid crystal layer of the array substrate, and a second polarizer arranged on a side opposite to the liquid crystal layer of the filter substrate. A polarization axis of the first polarizer and a polarization axis of the second polarizer intersect with each other at 90°, for example.

A driving system of the liquid crystal panel 30 is not particularly limited, and includes a transverse electric field system, such as an in-plane switching system. A driving circuit 31 for the liquid crystal panel 30 is arranged on a surface of the backlight 40 on a side opposite to the liquid crystal panel 30, as illustrated in FIG. 1.

The liquid crystal panel 30 is affixed to the transparent plate 20 via an adhesive layer for liquid crystal panel 39. A material of the adhesive layer for liquid crystal panel 39 includes, for example, a photocurable resin. The photocurable resin may be an acrylic resin, a silicone resin, an epoxy resin, or the like.

A shear storage modulus of the adhesive layer for liquid crystal panel 39 at a temperature of 25° C. and a frequency of 1 Hz falls within a range of $1\times10^2$ Pa to $1\times10^7$ Pa, for example. The shear storage modulus preferably falls within a range of $1\times10^3$ Pa to $1\times10^6$ Pa.

A thickness of the adhesive layer for liquid crystal panel 30, for example, falls within a range of 0.1 mm to 2.0 mm, and preferably falls within a range of 0.2 mm to 0.8 mm.

Note that a touch sensor may be arranged on the transparent plate 20 on a side opposite to the liquid crystal panel 30. Moreover, the touch sensor may be arranged between the transparent plate 20 and the liquid crystal panel 30. In the case where the display apparatus 10 is a touch panel, the touch sensor is embedded in the display apparatus 10. The touch sensor detects a contact/approach of an object, such as a finger, with/to a screen of the display apparatus 10. A detection system for the touch sensor is not particularly limited, and may be, for example, an electrostatic capacitance system. The electrostatic capacitance system includes a surface type electrostatic capacitance system, and a projection type electrostatic capacitance system. The projection type electrostatic capacitance system includes a self-capacitance system, a mutual capacitance system, and the like. In case of using the mutual capacitance system, a simultaneous multipoint detection can be performed, and it is preferable.

<Backlight>

The backlight 40 may be a commonly used backlight for a liquid crystal panel. The backlight 40 may be an edge light type or a directly under type. The backlight may include a variety of optical films in addition to light-emitting elements. The optical film has a function of equalizing intensities of light, changing view angles, or enhancing use efficiency of light. An interval between the backlight 40 and the transparent plate 20 is maintained by a spacer 45 (See FIG. 1 and FIG. 5). The spacer 45 maintains the interval between the transparent plate 20 and the backlight 40, and thereby forms a gap between the backlight 40 and the liquid crystal panel 30.

The spacer 45 is arranged, for example, at a position that overlaps with the light shielding layer 25, viewed in the X-direction. The spacer 45 can be hidden from a user viewing the liquid crystal panel 30 through the transparent plate 20. The spacer 45 is arranged, for example, at each of the corners of the backlight 40, as illustrated in FIG. 1.

Figure 5:
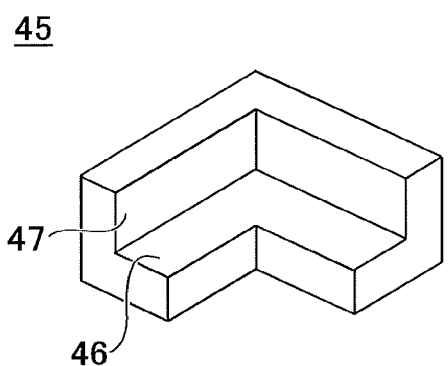
FIG. 5 is a perspective view depicting a spacer according to the embodiment.

FIG. 5 is a perspective view depicting the spacer according to the embodiment. The spacer 45 includes, for example, an installation surface 46 on which the backlight 40 is installed and a projection portion 47 that projects from the installation surface 46. The projection portion 47, as illustrated in FIG. 1, faces an end surface 41 of the backlight 40 and restricts a moving range of the backlight 40 in a position alignment processing (step S13 in FIG. 6), which will be described later.

To the end surface 41 of the backlight 40, the fixing support 50 is screwed. In the screwing process, a male screw 61 and a female screw 65 are used. The male screw 61 penetrates through the elongated hole 53 of the fixing support 50, and is mated with the female screw 65. The female screw 65 is arranged, for example, on the end surface 41 of the backlight 40.

<Fixing Support>

The fixing support 50 includes a first opposing portion 51 that opposes the main surface 21 of the transparent plate 20, and a second opposing portion 52 that opposes the end surface 41 of the backlight 40. The first opposing portion 51 and the second opposing portion 52 form an L-shaped angle. Note that a cross-sectional shape of the fixing support 50 is an L-shape in the embodiment. However, the cross-sectional shape is not particularly limited and may be a rectangular ring shape, for example.

The first opposing portion 51 is formed in a plate shape, for example. To a surface of the first opposing portion 51 that faces the transparent plate 20, an adhesive layer for fixing support 59 is affixed for fixing the fixing support 50 to the transparent plate 20. The adhesive layer for fixing support 59 may be formed of the same material as the adhesive layer for liquid crystal panel 39, for example. Moreover, the adhesive layer for fixing support 59 may be formed of a publicly-known double-sided tape or the like.

The second opposing portion 52 is formed in a plate shape, for example. In the second opposing portion 52, the elongated hole 53, which the male screw 61 penetrates, is formed. A dimension in the X-direction of the elongated hole 53 is greater than a dimension in the Y-direction. A longitudinal direction of the elongated hole 53 is the X-direction, and a width direction of the elongated hole 53 is the Y-direction.

The male screw 61 includes a shaft part 62 to be mated with the female screw 65, and a head part 63 having a greater diameter than a diameter of the shaft part 62. As illustrated in FIG. 3, the diameter of the shaft part 62 is less than the dimension in the width direction of the elongated hole 53, and the diameter of the head part 63 is greater than the dimension in the width direction of the elongated hole 53. However, in the case of arranging a washer between the head part 63 and the second opposing portion 52, the diameter of the head part 63 may be less than the dimension in the width direction of the elongated hole 53.

The female screw 65 is arranged, for example, on the end surface 41 of the backlight 40. The female screw 65 may be arranged as a part of the backlight 40, or may be formed separately from the backlight 40 and fixed to the backlight 40 with an adhesive or the like.

The first opposing portion 51 is affixed to the main surface 21 of the transparent plate 20. In contrast, the second opposing portion 52 is fastened with the end surface 41 of the backlight 40 by the male screw 61, which penetrates through the elongated hole 53 of the second opposing portion 52, and the female screw 65, to be mated with the male screw 61. The second opposing portion 52 is clamped, for example, between the head part 63 of the male screw 61 and the end surface 41 of the backlight 40.

Note that, the positions of the male screw 61 and the female screw 65 may be reversed, which will be described in detail later. Specifically, the male screw 61 may be protrusively provided from the end surface 41 of the backlight 40, and the female screw 65 may be mated with a tip of the male screw 61. In this case, the female screw 65 is arranged on the second opposing portion 52 on a side opposite to the backlight 40, and the second opposing portion 52 is clamped between the female screw 65 and the end surface 41 of the backlight 40.

<Manufacturing Method of Display Apparatus>

Figure 6:
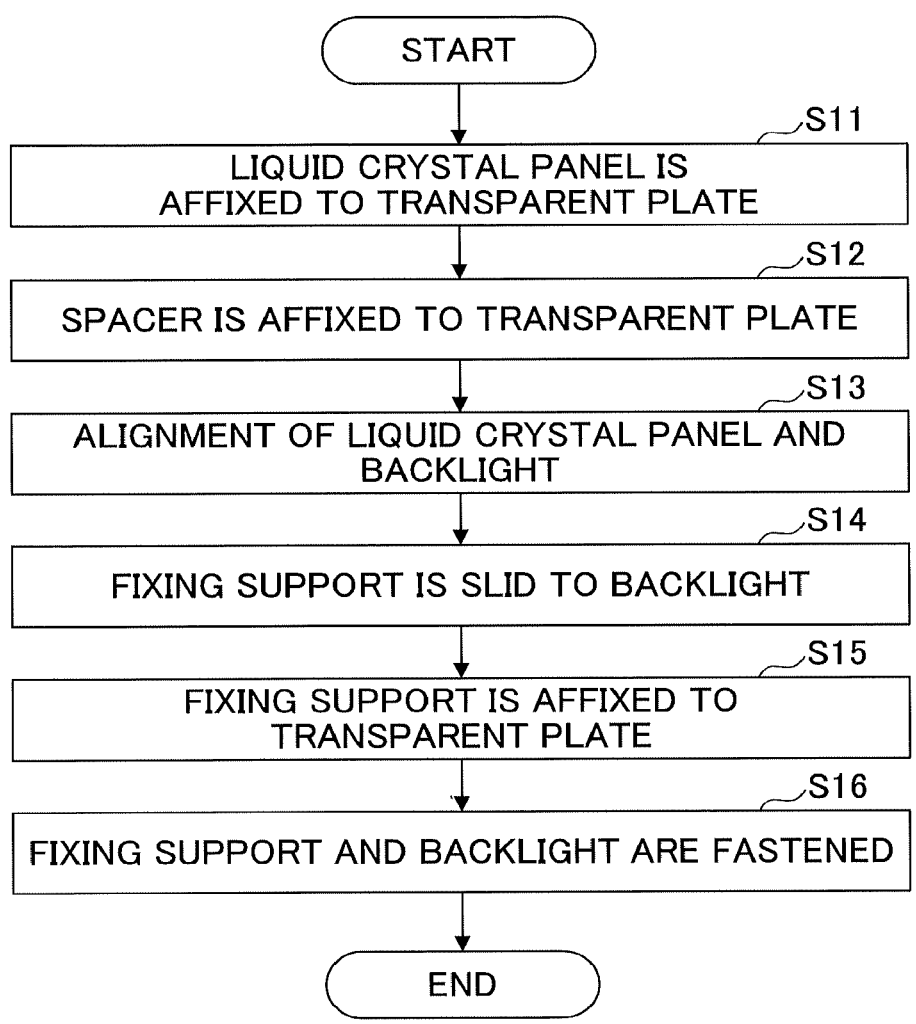
FIG. 6 is a flowchart depicting a manufacturing method of the display apparatus according to the embodiment.
Figure 7:
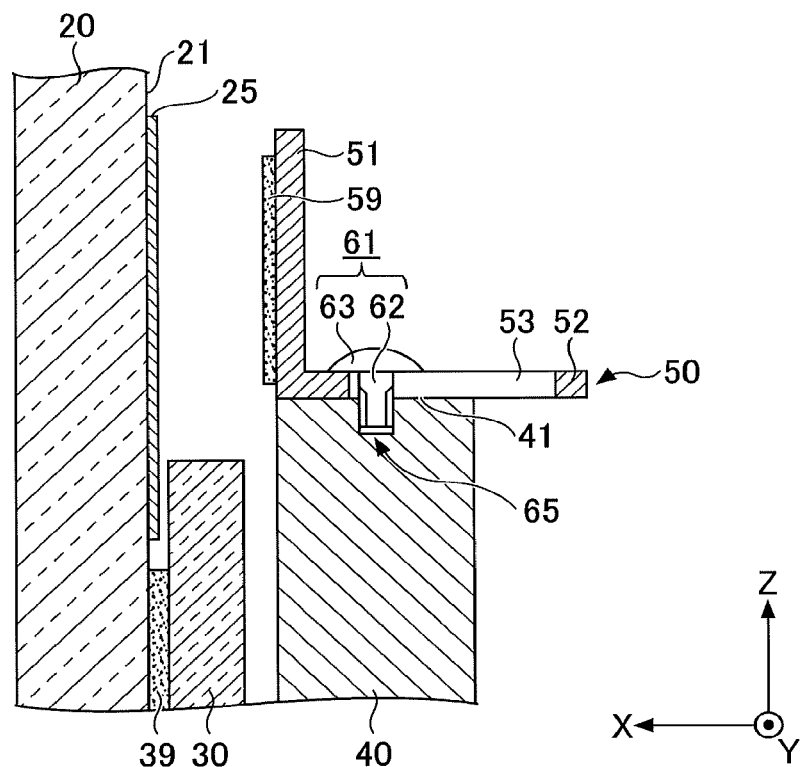
FIG. 7 is a diagram for explaining a position alignment for a liquid crystal panel with a backlight according to the embodiment.
Figure 8:
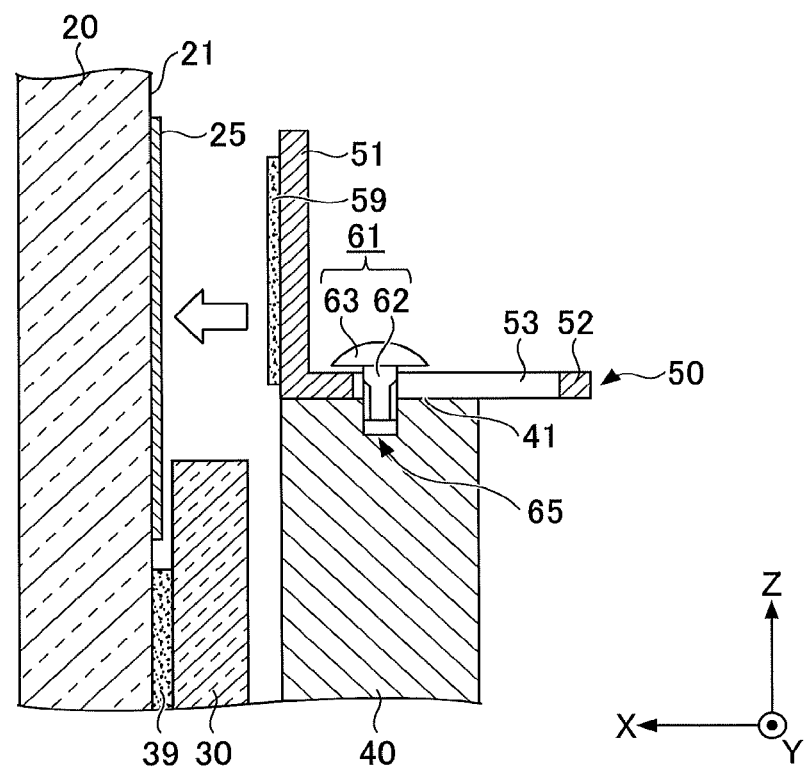
FIG. 8 is a diagram depicting a sliding motion of a fixing support with respect to the backlight.

FIG. 6 is a flowchart depicting a manufacturing method of the display apparatus according to the embodiment. FIG. 7 is a diagram for explaining a position alignment for a liquid crystal panel and a backlight according to the embodiment. FIG. 8 is a diagram depicting a sliding motion of a fixing support with respect to the backlight.

First, the liquid crystal panel 30 is affixed to the transparent plate 20 (step S11 in FIG. 6). The liquid crystal panel 30 is affixed to the main surface 21 of the transparent plate 20 via the adhesive layer for liquid crystal panel 39. On the main surface 21 of the transparent plate 20, the light shielding layer 25 is preliminarily formed in a frame shape, and the liquid crystal panel 30 is affixed to the transparent plate 20 so that the open region of the light shielding layer 25 and the image display region of the liquid crystal panel 30 coincide each other, viewed in the X-direction.

Next, the spacers 45 are affixed to the transparent plate 20 (step S12 in FIG. 6). The spacers 45 are affixed to the main surface 21 of the transparent plate 20. The spacers 45 may be affixed to the transparent plate 20 so as to overlap with the light shielding layer 25, viewed in the X-direction. The spacers 45 maintain an interval between the transparent plate 20 and the backlight 40. The spacers 45 also have a role of restricting a moving range of the backlight 40 in a position alignment processing, which will be described later (step S13 in FIG. 6).

Next, a position alignment of the liquid crystal panel 30 and the backlight 40 is performed (step S13 in FIG. 6). Specifically, the liquid crystal panel 30 in an in-plane direction (in the Y-direction and the Z-direction) on the main surface 21 of the transparent plate 20 is aligned with the backlight 40, with maintaining the interval between the transparent plate 20 and the backlight 40 by the spacers 45, for example. The position alignment is performed so that the backlight 40 uniformly illuminates the liquid crystal panel

30. To the backlight 40, the fixing support 50 may be preliminarily attached by a screw.

Next, the fixing support 50 is slid with respect to the backlight 40 (step S14 in FIG. 6). The fixing support 50 can be slid when the male screw 61 is loosened, as illustrated in FIG. 8. The fixing support 50 may be slid in a state where the male screw 61 and the female screw 65 are mated in order to regulate a motion of the fixing support 50 in the Y-direction or the Z-direction. The motion of the fixing support 50 in the Y-direction is regulated by the shaft part 62 of the male screw 61 mated with the female screw 65. Moreover, the motion of the fixing support 50 in the Z-direction is regulated by the head part 63 of the male screw 61 mated with the female screw 65. The fixing support 50 is slid, when the second opposing portion 52 of the fixing support 50 contacts the end surface 41 of the backlight 40.

In step S14, for example, with maintaining the interval between the transparent plate 20 and the backlight 40, the fixing support 50 is slid in the longitudinal direction of the elongated hole 53 (X-direction) with respect to the backlight 40, and thereby the first opposing portion 51 of the fixing support 50 is caused to approach the main surface 21 of the transparent plate 20. Thus, the adhesive layer fixing support 59 affixed to the first opposing portion 51 is caused to approach the main surface 21 of the transparent plate 20.

Next, the fixing support 50 is affixed to the transparent plate 20 (step S15 in FIG. 6). Specifically, the first opposing portion 51 of the fixing support 50 is caused to face the main surface 21 of the transparent plate 20, the second opposing portion 52 of the fixing support 50 is caused to face the end surface 41 of the backlight 40, and thereby the first opposing portion 51 is affixed to the main surface 21 of the transparent plate 20.

Next, the fixing support 50 and the backlight 40 are fastened (step S16 in FIG. 6). Specifically, the male screw 61 is rotated so as to clamp the second opposing portion 52 of the fixing support 50 between the head part 63 of the male screw 61 and the end surface 41 of the backlight 40.

<SUMMARY>

As described above, according to the embodiment, the male screw 61 penetrates through the elongated hole 53 of the second opposing portion 52 of the fixing support 50, and is mated with the female screw 65, and thereby the backlight 40 and the fixing support 50 are fastened. Thus, for example, with maintaining the interval between the transparent plate 20 and the backlight 40, the fixing support 50 is slid in the longitudinal direction of the elongated hole 53 (X-direction) with respect to the backlight 40, and thereby the first opposing portion 51 of the fixing support 50 can be caused to approach the main surface 21 of the transparent plate 20.

Thus, as illustrated in FIGS. 7 and 8, after the position alignment for the liquid crystal panel 30 affixed to the transparent plate 20 with the backlight 40, with fixing the position of the backlight 40 with respect to the transparent plate 20, the fixing support 50 can be affixed to the transparent plate 20. The fixing support 50 and the backlight 40 are fastened thereafter. The backlight 40 is fixed to the transparent plate 20 via the fixing support 50.

Thus, according to the embodiment, from the position alignment of the liquid crystal panel 30 affixed to the transparent plate 20 with the backlight 40, until the fixture of the backlight 40 to the transparent plate 20 by the fixing support 50, a position of the backlight 40 is unchanged. As a result, the backlight 40 can be fixed precisely at a predetermined position on the liquid crystal panel 30 affixed to the transparent plate 20.

Note that, in the embodiment, the fixing support 50 is slid in the X-direction with respect to the backlight 40, in a state where the male screw 61 and the female screw 65 are mated, in order to regulate the motion of the fixing support 50 in the Y-direction or the Z-direction. However, the fixing support 50 may be slid in a state where the male screw 61 and the female screw 65 are not mated.

Moreover, in the embodiment, on the position alignment of the liquid crystal panel 30 affixed to the transparent plate 20 with the backlight 40 (step S13 in FIG. 6), the fixing support 50 is fixed to the backlight 40 with the screws. However, the fixing support 50 may be fixed to the backlight 40 without the screws.

<Display Apparatus According to First Variation>

Figure 9:
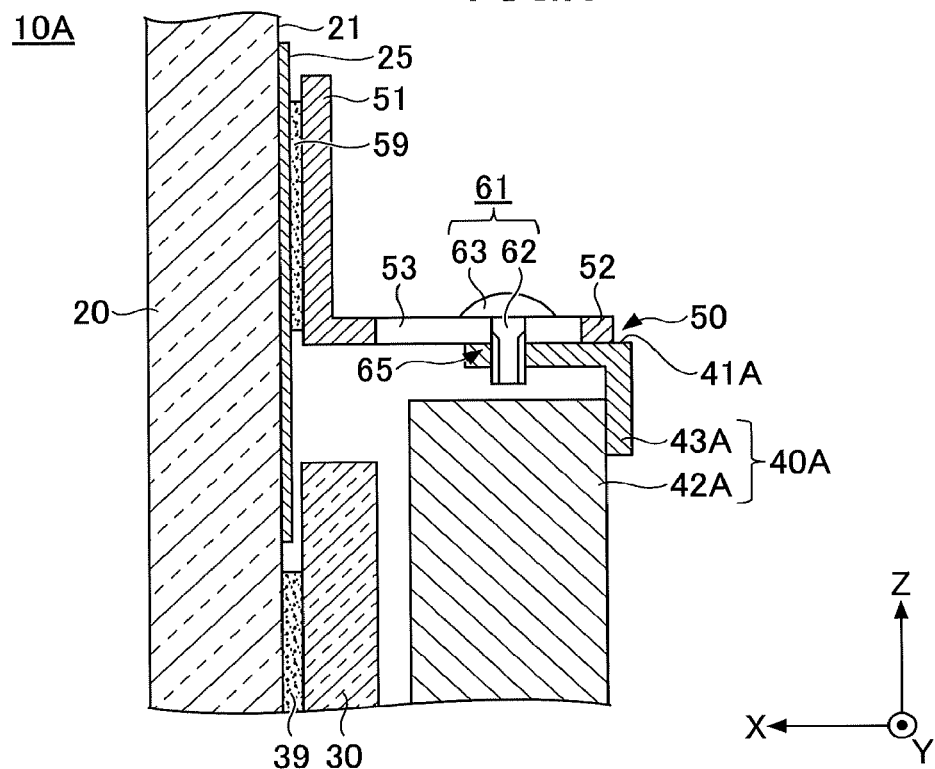
FIG. 9 is a cross-sectional view depicting a display apparatus according to a first variation.

FIG. 9 is a cross-sectional view depicting a display apparatus according to a first variation. A display apparatus 10A according to the first variation is different from the display apparatus 10 according to the embodiment in that a backlight 40A includes a backlight main body 42A and a screw attachment 43A. In the following, mainly the difference will be described.

The backlight main body 42A is configured in the same way as the backlight 40 according to the embodiment. On the other hand, the screw attachment 43A is fixed to the backlight main body 42A. On an end surface 41A of the screw attachment 43A, for example, a female screw 65 is arranged.

The fixing support 50 includes the first opposing portion 51 that opposes the main surface 21 of the transparent plate 20, and the second opposing portion 52 that opposes the end surface 41A of the backlight 40A. The first opposing portion 51 and the second opposing portion 52 form an L-shaped angle. Note that a cross-sectional shape of the fixing support 50 is an L-shape in the variation. However, the cross-sectional shape is not particularly limited and may be a rectangular ring shape, for example.

The male screw 61 includes a shaft part 62 to be mated with the female screw 65, and a head part 63 having a greater diameter than a diameter of the shaft part 62. The diameter of the shaft part 62 is less than the dimension in the width direction of the elongated hole 53 of the second opposing portion 52 (e.g. dimension in the Y-direction), and the diameter of the head part 63 is greater than the dimension in the width direction of the elongated hole 53. However, in the case of arranging a washer between the head part 63 and the second opposing portion 52, the diameter of the head part 63 may be less than the dimension in the width direction of the elongated hole 53.

The female screw 65 is arranged, for example, on the end surface 41A of the backlight 40A (in more detail, the screw attachment 43A). The female screw 65 may be arranged as a part of the screw attachment 43A, or may be formed separately from the screw attachment 43A and fixed to the screw attachment 43A with an adhesive or the like.

The first opposing portion 51 is affixed to the main surface 21 of the transparent plate 20. In contrast, the second opposing portion 52 is fastened with the end surface 41A of the backlight 40A by the male screw 61, which penetrates through the elongated hole 53 of the second opposing portion 52, and the female screw 65, to be mated with the male screw 61. The second opposing portion 52 is clamped, for example, between the head part 63 of the male screw 61 and the end surface 41A of the backlight 40A.

Note that, the positions of the male screw 61 and the female screw 65 may be reversed, which will be described in detail later. Specifically, the male screw 61 may be protrusively provided from the end surface 41A of the backlight 40A, and the female screw 65 may be mated with a tip of the male screw 61. In this case, the female screw 65 is arranged on the second opposing portion 52 on a side opposite to the backlight 40A, and the second opposing portion 52 is clamped between the female screw 65 and the end surface 41A of the backlight 40A.

According to the variation, in the same way as the embodiment, the male screw 61 penetrates through the elongated hole 53 of the second opposing portion 52 of the fixing support 50, and is mated with the female screw 65, and thereby the backlight 40A and the fixing support 50 are fastened. Thus, for example, with maintaining the interval between the transparent plate 20 and the backlight 40A, the fixing support 50 is slid in the longitudinal direction of the elongated hole 53 (X-direction) with respect to the backlight 40A, and thereby the first opposing portion 51 of the fixing support 50 can be caused to approach the main surface 21 of the transparent plate 20. Thus, the same effect as that in the embodiment can be obtained.

<Display Apparatus According to Second Variation>

Figure 10:
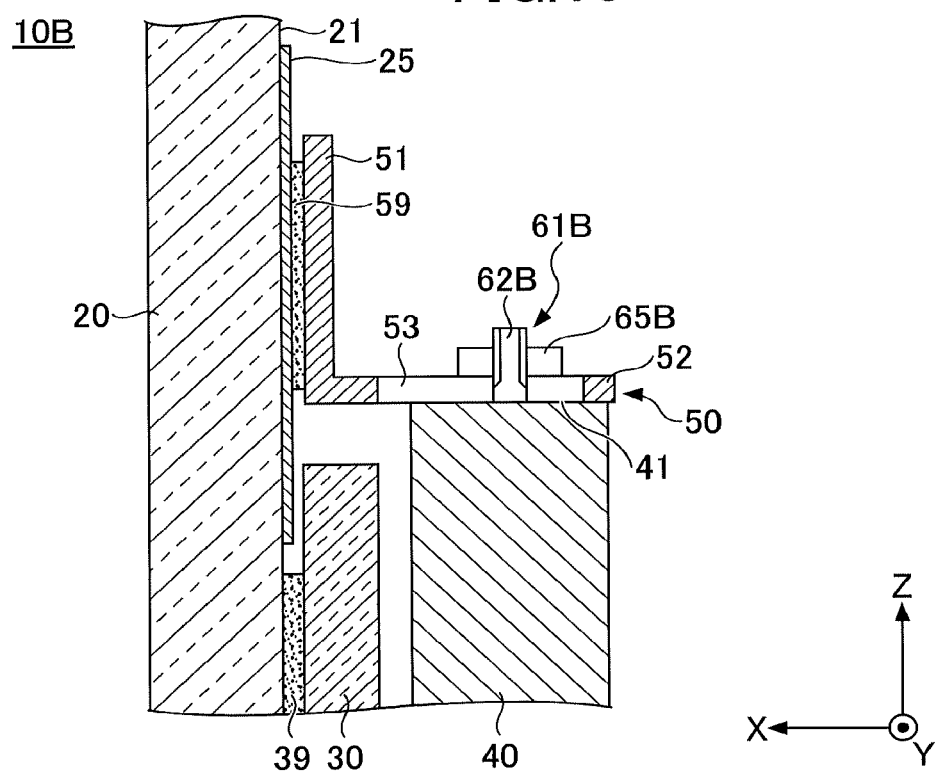
FIG. 10 is a cross-sectional view depicting a display apparatus according to a second variation.

FIG. 10 is a cross-sectional view depicting a display apparatus according to a second variation. A display apparatus 10B according to the second variation is different from the display apparatus 10 according to the embodiment in that a male screw 61B is arranged on the end surface 41 of the backlight 40, and the female screw 65B is mated with a tip of the male screw 61B. In the following, mainly the difference will be described.

The male screw 61B includes a shaft part 62B to be mated with the female screw 65B. The shaft part 62B is protrusively provided from the end surface 41 of the backlight 40, and penetrates through the elongated hole 53 of the second opposing portion 52 of the fixing support 50. The male screw 61B may be arranged as a part of the backlight 40, or may be formed separately from the backlight 40 and fixed to the backlight 40 with an adhesive or the like.

The female screw 65B is arranged on the second opposing portion 52 of the fixing support 50 on a side opposite to the backlight 40. A diameter of the female screw 65B is greater than the dimension in the width direction of the elongated hole 53 of the second opposing portion 52 (e.g. dimension in the Y-direction). However, in the case of arranging a washer between the female screw 65B and the second opposing portion 52, the diameter of the female screw 65B may be less than the dimension in the width direction of the elongated hole 53.

The fixing support 50 includes the first opposing portion 51 and the second opposing portion 52. The first opposing portion is affixed to the main surface 21 of the transparent plate 20. On the other hand, the second opposing portion 52 is fastened with the end surface 41 of the backlight 40 by the male screw 61B, which penetrates through the elongated hole 53 of the second opposing portion 52, and the female screw 65B, to be mated with the male screw 61B. The second opposing portion 52 is clamped between the female screw 65B and the end surface 41 of the backlight 40.

The fixing support 50 can be slid with respect to the backlight 40 when the female screw 65B is loosened. The fixing support 50 may be slid in a state where the male screw 61B and the female screw 65B are mated in order to regulate a motion of the fixing support 50 in the Y-direction or the Z-direction. The motion of the fixing support 50 in the Y-direction is regulated by the shaft part 62B of the male screw 61B. Moreover, the motion of the fixing support 50 in the Z-direction is regulated by the female screw 65B mated with the male screw 61B. The fixing support 50 is slid, when the second opposing portion 52 of the fixing support 50 contacts the end surface 41 of the backlight 40.

According to the variation, in the same way as the embodiment, the male screw 61B penetrates through the elongated hole 53 of the second opposing portion 52 of the fixing support 50, and is mated with the female screw 65B, and thereby the backlight 40 and the fixing support 50 are fastened. Thus, for example, with maintaining the interval between the transparent plate 20 and the backlight 40, the fixing support 50 is slid in the longitudinal direction of the elongated hole 53 (X-direction) with respect to the backlight 40, and thereby the first opposing portion 51 of the fixing support 50 can be caused to approach the main surface 21 of the transparent plate 20. Thus, the same effect as that in the embodiment can be obtained.

<Display Apparatus According to Third Variation>

Figure 11:
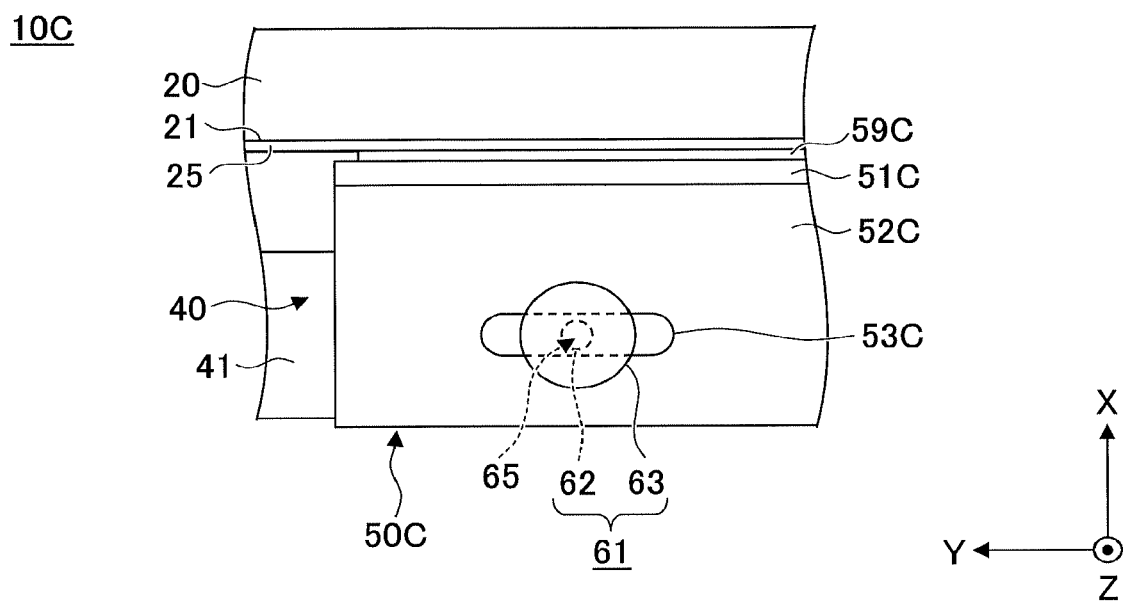
FIG. 11 is a diagram depicting a display apparatus according to a third variation viewed from a Z-direction.

FIG. 11 is a diagram depicting a display apparatus according to a third variation viewed from the Z-direction. A display apparatus 10C according to the third variation is different from the display apparatus 10 according to the embodiment in that a dimension in the Y-direction of an elongated hole 53C is greater than a dimension in the X-direction of the elongated hole 53C. In the following, mainly the difference will be described.

A fixing support 50C includes a first opposing portion 51C that opposes the main surface 21 of the transparent plate 20, and a second opposing portion 52C that opposes the end surface 41 of the backlight 40. The first opposing portion 51C and the second opposing portion 52C form an L-shaped angle. Note that a cross-sectional shape of the fixing support 50C is an L-shape in the variation. However, the cross-sectional shape is not particularly limited and may be a rectangular ring shape, for example.

The first opposing portion 51C is formed in a plate shape, for example. To a surface of the first opposing portion 51C that faces the transparent plate 20, an adhesive layer for fixing support 59C is affixed for fixing the fixing support 50C to the transparent plate 20. The adhesive layer for fixing support 59C may be formed of the same material as the adhesive layer for liquid crystal panel 39, for example. Moreover, the adhesive layer for fixing support 59C may be formed of a publicly-known double-sided tape or the like.

The second opposing portion 52C is formed in a plate shape, for example. In the second opposing portion 52C, the elongated hole 53C, which the male screw 61 penetrates, is formed. The dimension in the Y-direction of the elongated hole 53C is greater than the dimension in the X-direction. A longitudinal direction of the elongated hole 53C is the Y-direction, and a width direction of the elongated hole 53C is the X-direction.

The male screw 61 includes a shaft part 62 to be mated with the female screw 65, and a head part 63 having a greater diameter than a diameter of the shaft part 62. As illustrated in FIG. 4, the diameter of the shaft part 62 is less than the dimension in the width direction of the elongated hole 53C, and the diameter of the head part 63 is greater than the dimension in the width direction of the elongated hole 53C. However, in the case of arranging a washer between the head part 63 and the second opposing portion 52C, the diameter of the head part 63 may be less than the dimension in the width direction of the elongated hole 53C.

The female screw 65 is arranged, for example, on the end surface 41 of the backlight 40. The female screw 65 may be arranged as a part of the backlight 40, or may be formed separately from the backlight 40 and fixed to the backlight 40 with an adhesive or the like. Note that the backlight 40 may be configured in the same way as the backlight 40A in the first variation.

The first opposing portion 51C is affixed to the main surface 21 of the transparent plate 20. In contrast, the second opposing portion 52C is fastened with the end surface 41 of the backlight 40 by the male screw 61, which penetrates through the elongated hole 53C of the second opposing portion 52C, and the female screw 65, to be mated with the male screw 61. The second opposing portion 52C is clamped, for example, between the head part 63 of the male screw 61 and the end surface 41 of the backlight 40.

Note that, the positions of the male screw 61 and the female screw 65 may be reversed, which will be described in detail later. Specifically, the male screw 61 may be protrusively provided from the end surface 41 of the backlight 40, and the female screw 65 may be mated with a tip of the male screw 61. In this case, the female screw 65 is arranged on the second opposing portion 52C on a side opposite to the backlight 40, and the second opposing portion 52C is clamped between the female screw 65 and the end surface 41 of the backlight 40.

<Manufacturing Method of Display Apparatus According to Third Variation>

Figure 12:
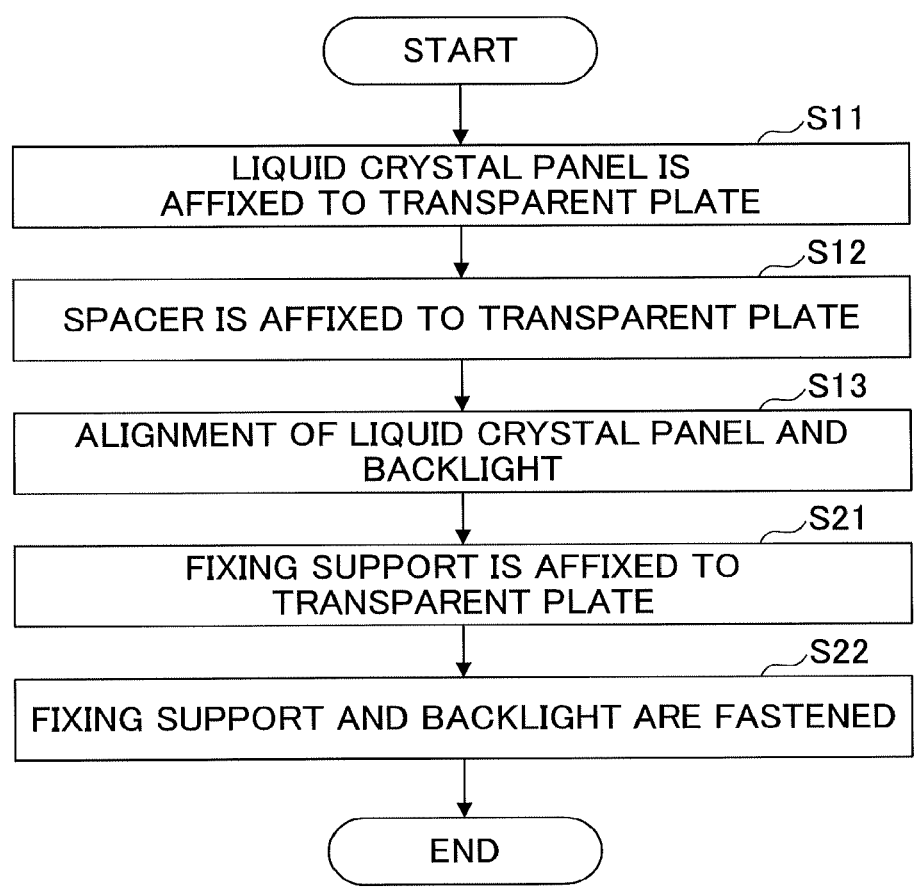
FIG. 12 is a flowchart depicting a manufacturing method of the display apparatus according to the third variation.

FIG. 12 is a flowchart depicting a manufacturing method of the display apparatus according to the third variation. Note that steps S11 to S13 in FIG. 12 are the same as steps S11 to S13 in FIG. 6, and redundant explanation will be omitted.

In FIG. 12, after step S13, the fixing support 50C is affixed to the transparent plate 20 (step S21 in FIG. 12). Specifically, the first opposing portion 51C of the fixing support 50C is caused to face the main surface 21 of the transparent plate 20, the second opposing portion 52C of the fixing support 50C is caused to face the end surface 41 of the backlight 40, and thereby the first opposing portion 51C is affixed to the main surface 21 of the transparent plate 20. In more detail, the first opposing portion 51C is affixed to the main surface 21 of the transparent plate 20 at a position where the elongated hole 53C of the second opposing portion 52C overlaps with a screw hole of the female screw 65, viewed in the Z-direction.

Next, the fixing support 50C and the backlight 40 are fastened (step S22 in FIG. 12). Specifically, the male screw 61 is rotated so as to clamp the second opposing portion 52C of the fixing support 50C between the head part 63 of the male screw 61 and the end surface 41 of the backlight 40.

As described above, according to the variation, the male screw 61 penetrates through the elongated hole 53C of the second opposing portion 52C of the fixing support 50C, and is mated with the female screw 65, and thereby the backlight 40 and the fixing support 50C are fastened. Because the elongated hole 53C is long in the Y-direction, an accuracy required of the affixing position of the fixing support 50C in the Y-direction can be reduced. That is, even if the affixing position of the fixing support 50C deviates from the predetermined position to a certain degree in the Y-direction, after the position alignment of the liquid crystal panel 30 affixed to the transparent plate 20 with the backlight 40, with a position of the backlight 40 being fixed relative to the transparent plate 20, the fixing support 50C can be affixed to the transparent plate 20. The fixing support 50C and the backlight 40 are fastened thereafter. The backlight 40 is fixed to the transparent plate 20 via the fixing support 50C. Thus, according to the variation, from the position alignment of the liquid crystal panel 30 affixed to the transparent plate 20 with the backlight 40, until the fixture of the backlight 40 to the transparent plate 20 by the fixing support 50C, the position of the backlight 40 is unchanged. As a result, the backlight 40 can be fixed precisely at a predetermined position relative to the liquid crystal panel 30 affixed to the transparent plate 20.

Note that, although, in the variation, the female screw 65 is arranged on the backlight 40, the male screw 61 may be arranged on the backlight 40. In this case, the first opposing portion 51C is affixed to the main surface 21 of the transparent plate 20 at a position where the shaft part 62 of the male screw 61 overlaps with the elongated hole 53C of the second opposing portion 52C, viewed in a normal direction to the end surface 41 of the backlight 40 (viewed in the Z-direction). Because the elongated hole 53C is long in the Y-direction, the accuracy required of the affixing position of the fixing support 50C in the Y-direction can be reduced. That is, even if the affixing position of the fixing support 50C deviates from the predetermined position to a certain degree in the Y-direction, after the position alignment of the liquid crystal panel 30 affixed to the transparent plate 20 with the backlight 40, with a position of the backlight 40 being fixed relative to the transparent plate 20, the fixing support 50C can be affixed to the transparent plate 20. The fixing support 50C and the backlight 40 are fastened thereafter. The backlight 40 is fixed to the transparent plate 20 via the fixing support 50C. Thus, also in this case, from the position alignment of the liquid crystal panel 30 affixed to the transparent plate 20 with the backlight 40, until the fixture of the backlight 40 to the transparent plate 20 by the fixing support 50C, the position of the backlight 40 is unchanged. As a result, the backlight 40 can be fixed precisely at a predetermined position relative to the liquid crystal panel 30 affixed to the transparent plate 20.

Note that, between the process at step S21 and the process at step S22 in FIG. 12, the backlight 40 can be slid in the longitudinal direction of the elongated hole 53C with respect to the fixing support 50C in order to perform the position alignment for the liquid crystal panel 30 with the backlight again. The fixing support 50C may be slid in a state where the male screw 61 and the female screw 65 are mated in order to regulate a motion of the fixing support 50C in the Y-direction or the Z-direction. The motion of the fixing support 50C in the X-direction is regulated by the shaft part 62 of the male screw 61 mated with the female screw 65. Moreover, the motion of the fixing support 50C in the Z-direction is regulated by the head part 63 of the male screw 61 mated with the female screw 65. The fixing support 50C is slid, when the second opposing portion 52C of the fixing support 50C contacts the end surface 41 of the backlight 40.

<Variations and Enhancements>

As described above, embodiments and the like of a display apparatus and a manufacturing method of the display apparatus have been described. The present invention is not limited to the embodiments or the like. Various variations and enhancements may be made without departing from the scope of the present invention.

Figure 13A:
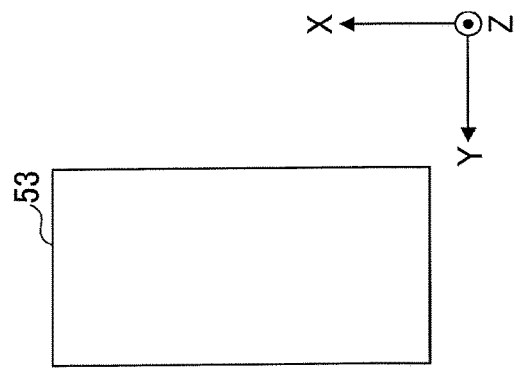
FIGS. 13A to 13I are diagrams depicting examples of the elongated hole illustrated in FIG. 4 according to the variations.
Figure 13B:
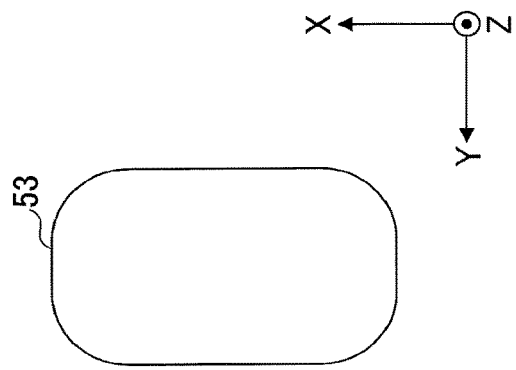
Figure 13C:
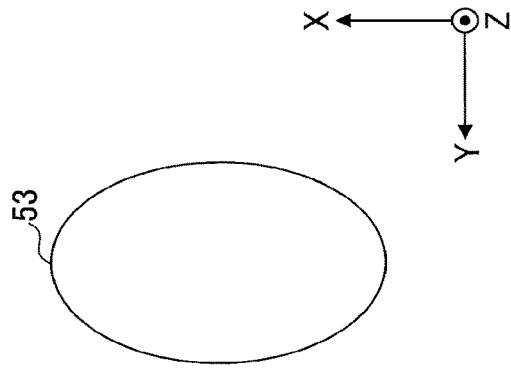
Figure 13D:
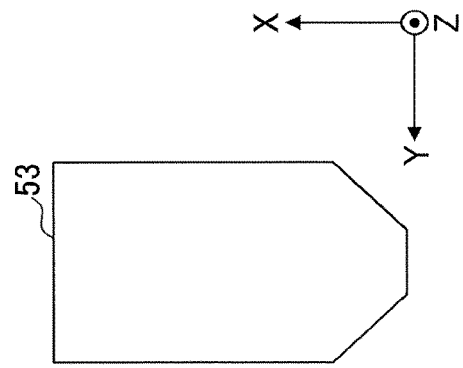
Figure 13E:
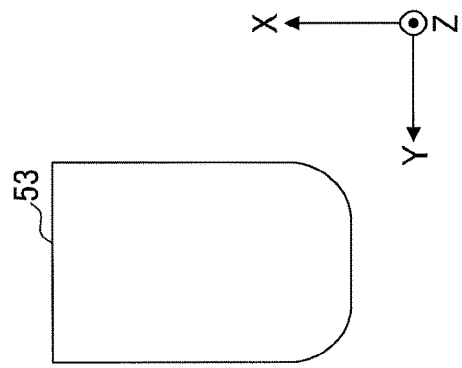
Figure 13F:
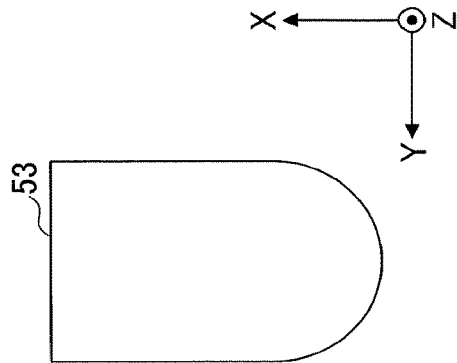
Figure 13G:
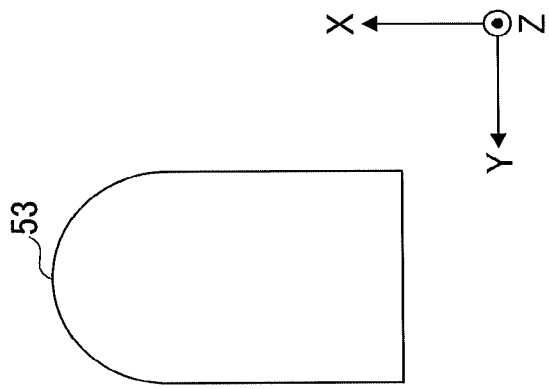
Figure 13H:
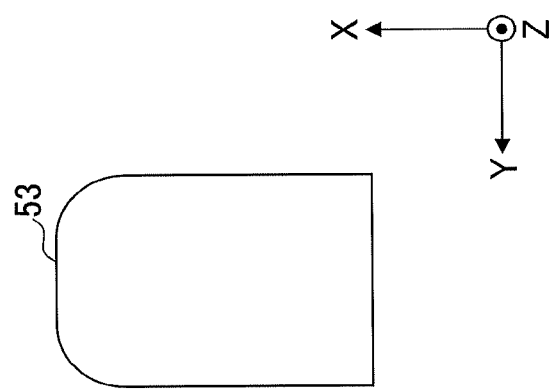
Figure 13I:
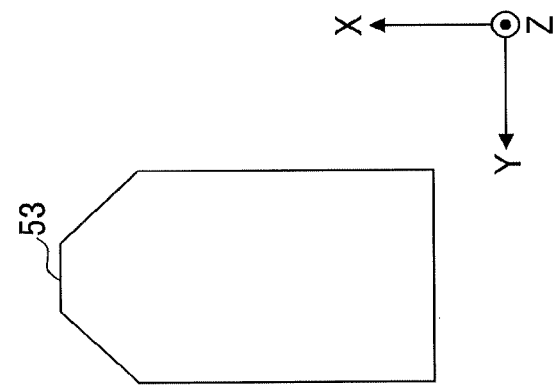
Figure 14A:
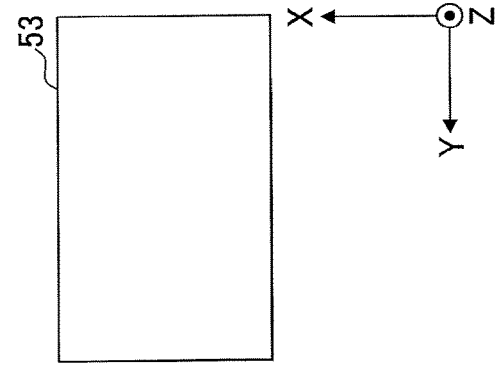
FIGS. 14A to 14I are diagrams depicting examples of the elongated hole illustrated in FIG. 11 according to the variations.
Figure 14B:
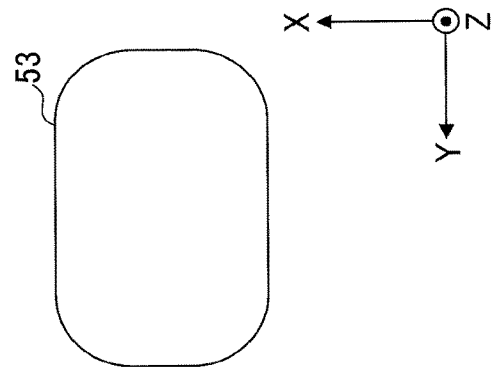
Figure 14C:
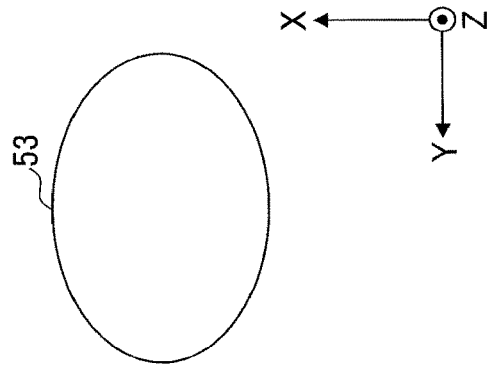
Figure 14D:
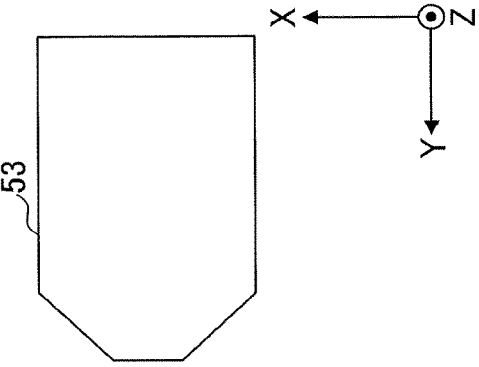
Figure 14E:
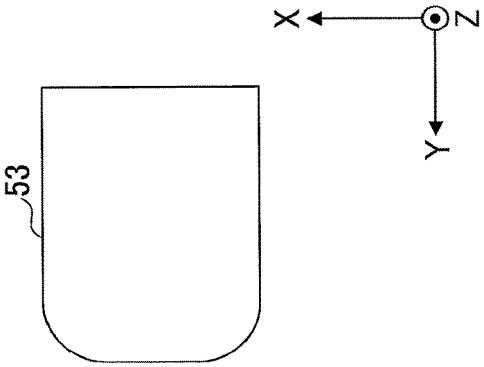
Figure 14F:
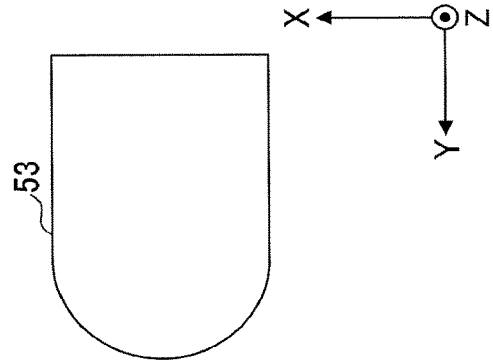
Figure 14I:
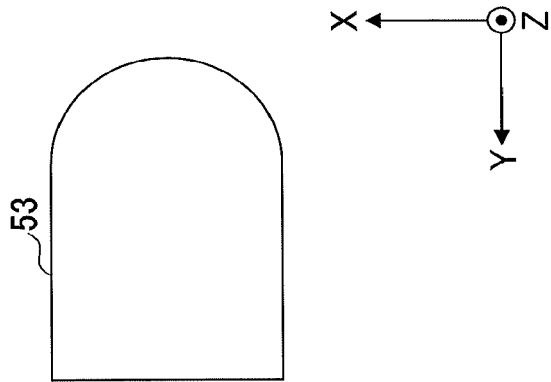
Figure 14H:
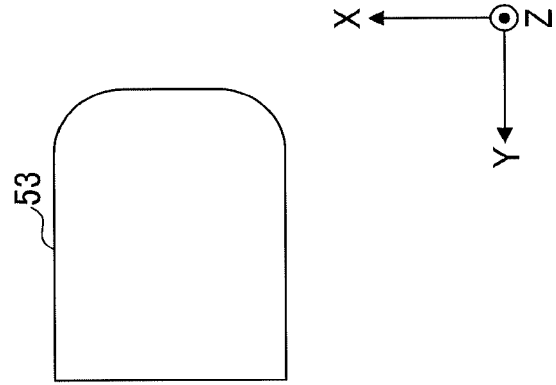
Figure 14G:
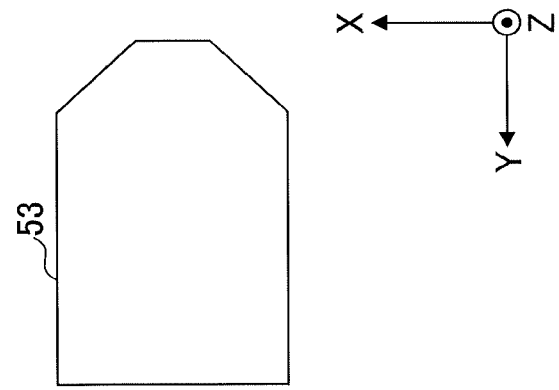
Figure 15:
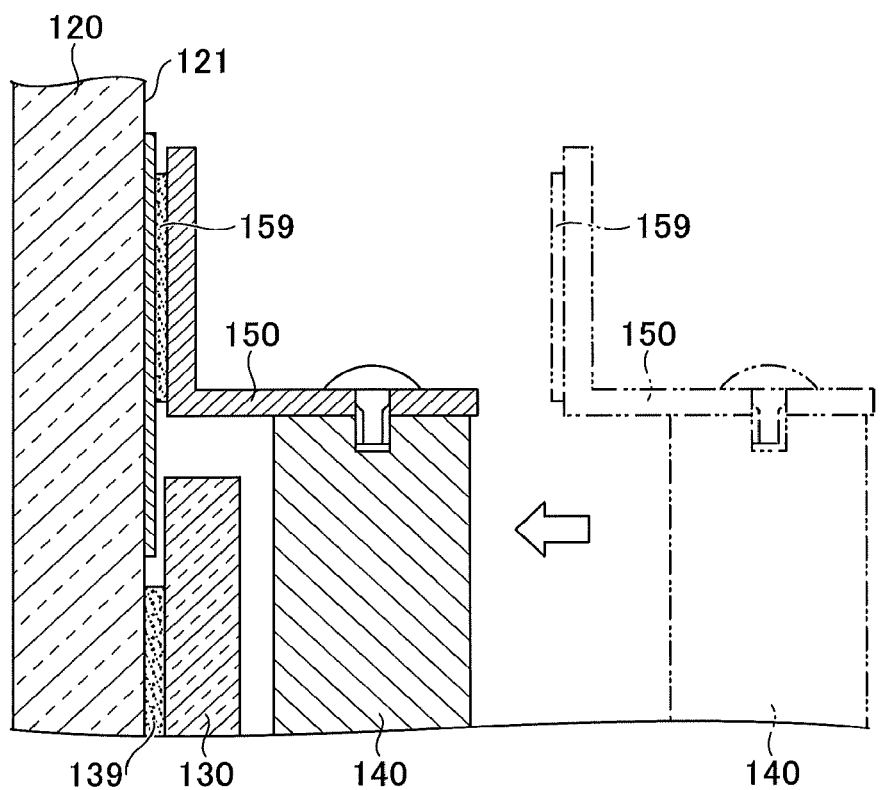
FIG. 15 is a diagram depicting an example of a display apparatus according to a related art.

For example, instead of the elongated hole 53 as illustrated in FIG. 4, an elongated hole 53 as illustrated in any of FIGS. 13A to 13I may be used. In the case where the fixing support 50 is an L-shaped angle, if a peripheral edge shape of an extreme portion in the X-direction of the elongated hole 53 has a shape with a corner, when the fixing support 50 is bent into an L-shape, the extreme portion in the X-direction of the elongated hole 53 is unlikely to deform, and the shape of the extreme portion in the X-direction is likely to be maintained. Thus, the peripheral edge shape of the extreme portion in the X-direction of the elongated hole 53 is preferably a shape with a corner, and particularly preferably a rectangular shape. Specifically, an elongated hole 53, illustrated in FIG. 13D, is more preferable than an elongated hole 53, illustrated in FIG. 13G, because a peripheral edge shape of an extreme portion in the X-direction in FIG. 13D has a rectangular shape, and the aforementioned shape of the extreme portion in the X-direction of the elongated hole 53 is likely to be maintained. Similarly, an elongated hole 53, illustrated in FIG. 13E, is more preferable than an elongated hole 53, illustrated in FIG. 13H, because the aforementioned shape of the extreme portion in the X-direction of the elongated hole 53 is likely to be maintained. Furthermore, an elongated hole 53, illustrated in FIG. 13F, is more preferable than an elongated hole 53, illustrated in FIG. 13I, because the aforementioned shape of the extreme portion in the X-direction of the elongated hole 53 is likely to be maintained.

Moreover, instead of the elongated hole 53C as illustrated in FIG. 11, an elongated hole 53 as illustrated in any of FIGS. 14A to 14I may be used.

Note that, in the case of using the aforementioned fastening structure for a long period of time, an engagement of the male screw 61 and the female screw 65 may be loosened or released due to an influence from vibrations. In order to prevent the engagement from loosening or releasing, for example, a liquid adhesive may be applied so as to cover the fastening structure, or applied in a gap portion between the elongated hole 53 and the head part 63, and dried, to form a coat. For the liquid adhesive, a publicly known liquid adhesive may be used. Moreover, for the liquid adhesive, an anaerobic adhesive, i.e. an adhesive having a property that curing begins when an air is shut off. The anaerobic adhesive includes, for example, a room temperature curing adhesive containing an anaerobic polymerizable monomer having (meth)acrylic group, and a radical polymerization initiator, as main components.

REFERENCE SIGNS LIST 10 display apparatus
20 transparent plate
21 main surface
30 liquid crystal panel
40 backlight
41 end surface
50 fixing support
51 first opposing portion
52 second opposing portion
53 elongated hole
61 male screw
65 female screw

What is claimed is:

1. A display apparatus comprising:
a transparent plate;
a liquid crystal panel affixed to a main surface of the transparent plate;
a backlight facing a main surface of the liquid crystal panel to illuminate the liquid crystal panel from a side opposite to the transparent plate;
a fixing support fixing the backlight to the transparent plate, and comprising a first opposing part that is affixed to the main surface of the transparent plate, and a second opposing part that is fastened to an end surface of the backlight and that has an elongated hole,
wherein the second opposing part is fastened to the end surface of the backlight with a male screw that penetrates through the elongated hole and a female screw that is mated with the male screw,
wherein the elongated hole has a dimension along a first direction, which is normal to the main surface of the transparent plate, larger than a dimension along a second direction, which is orthogonal to the first direction.

2. The display apparatus according to claim 1,
wherein an end portion of the elongated hole along the first direction has a sharp corner, and
wherein the fixing support has an L-shape.

3. The display apparatus according to claim 2,
wherein an angle of the sharp corner is a right angle.

4. The display apparatus according to claim 1, further comprising:
a spacer provided between the transparent plate and the backlight, and maintaining a distance between the transparent plate and the backlight.

5. The display apparatus according to claim 4,
wherein the transparent plate has a light shielding layer on a surface thereof, and the spacer is positioned such that the spacer is hidden by the light shielding layer when viewed from a side opposite to the liquid crystal panel with respect to the transparent plate.

6. The display apparatus according to claim 4,
wherein the backlight has a rectangular shape and the spacer is positioned at each corner of the rectangular shape.

7. A manufacturing method of a display apparatus comprising:
affixing a liquid crystal panel to a main surface of a transparent plate;
aligning a position of a backlight with a position of the liquid crystal panel in an in-plane direction of the main surface of the transparent plate, such that the backlight uniformly illuminates the liquid crystal panel from a side opposite to the transparent plate;
facing a first opposing portion of a fixing support to the main surface of the transparent plate;
facing a second opposing portion of the fixing support having an elongated hole to an end surface of the backlight and penetrating a male screw through the elongated hole; and
sliding the fixing support along the end surface of the backlight to affix the first opposing portion to the main surface of the transparent plate while maintaining the position of the backlight; and
fastening the second opposing portion to the backlight with the male screw and a female screw that is mated with the male screw,
wherein the elongated hole has a dimension along a first direction, which is normal to the main surface of the transparent plate, larger than a dimension along a second direction, which is orthogonal to the first direction.

8. The manufacturing method of the display apparatus according to claim 7,
wherein an end portion of the elongated hole along the first direction has a sharp corner, and
wherein the fixing support has an L-shape.

9. The manufacturing method of the display apparatus according to claim 8,
wherein an angle of the sharp corner is a right angle.

10. The manufacturing method of the display apparatus according to claim 7 further comprising:

applying a liquid adhesive so as to cover a fastening structure of the second opposing portion and the backlight; and drying the liquid adhesive to form a coat.

11. The manufacturing method of the display apparatus according to claim 10, wherein the liquid adhesive is an anaerobic adhesive.

12. The manufacturing method of the display apparatus according to claim 7 further comprising:

applying a liquid adhesive in a gap portion between the elongated hole and the male screw; and drying the liquid adhesive to form a coat.

13. The manufacturing method of the display apparatus according to claim 12, wherein the liquid adhesive is an anaerobic adhesive.

14. The manufacturing method of the display apparatus according to claim 7, further comprising affixing a spacer to the main surface of the transparent plate before the aligning of the position of the backlight, wherein the position of the backlight is aligned with the position of the liquid crystal panel while maintaining a distance between the backlight and the transparent plate by the spacer.

15. The manufacturing method of the display apparatus according to claim 14, wherein the transparent plate has a light shielding layer on a surface thereof, and the spacer is positioned such that the spacer is hidden by the light shielding layer when viewed from a side opposite to the liquid crystal panel with respect to the transparent plate.

16. The manufacturing method of the display apparatus according to claim 14, wherein the backlight has a rectangular shape and the spacer is positioned at each corner of the rectangular shape.

* * * * *